(12) United States Patent
Geyer et al.

(10) Patent No.: US 11,222,058 B2
(45) Date of Patent: Jan. 11, 2022

(54) FAMILIARITY-BASED TEXT CLASSIFICATION FRAMEWORK SELECTION

(71) Applicant: International Business Machines Corporation, Armonk, NY (US)

(72) Inventors: Ethan A. Geyer, Mebane, NC (US); Jonathan F. Brunn, Logan, UT (US); Jonathan Dunne, Dungarvan (IE); Naama Tepper, Koranit (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 329 days.

(21) Appl. No.: 15/840,559

(22) Filed: Dec. 13, 2017

(65) Prior Publication Data
US 2019/0179955 A1    Jun. 13, 2019

(51) Int. Cl.
| | | |
|---|---|---|
| *G06F 16/00* | (2019.01) | |
| *G06F 16/35* | (2019.01) | |
| *H04L 12/58* | (2006.01) | |
| *G06N 3/08* | (2006.01) | |
| *G06F 16/31* | (2019.01) | |

(52) U.S. Cl.
CPC .......... *G06F 16/35* (2019.01); *G06F 16/313* (2019.01); *G06N 3/08* (2013.01); *H04L 51/04* (2013.01); *H04L 51/16* (2013.01); *H04L 51/32* (2013.01)

(58) Field of Classification Search
CPC ........ G06F 16/35; G06F 16/313; G06F 40/30; G06F 16/9535; G06N 3/08; G06N 7/005; G06N 20/10; G06N 20/20; G06N 3/0445; H04L 51/04; H04L 51/16; H04L 51/32
See application file for complete search history.

(56) References Cited

U.S. PATENT DOCUMENTS

| | | | |
|---|---|---|---|
| 6,424,997 B1* | 7/2002 | Buskirk, Jr. | G06F 40/237 709/206 |
| 8,205,264 B1* | 6/2012 | Kailash | H04L 67/02 726/25 |
| 9,378,488 B1* | 6/2016 | Saraya | B60B 7/04 |
| 9,628,419 B2* | 4/2017 | Borenstein | H04L 51/08 |
| 10,643,292 B1* | 5/2020 | Gorman-Ladd | G06Q 50/01 |
| 11,153,246 B1* | 10/2021 | Brooks | H04L 69/28 |
| 2005/0060643 A1* | 3/2005 | Glass | G06F 40/169 715/205 |

(Continued)

OTHER PUBLICATIONS

Danisman, T. et al.; "Feeler: Emotion Classification of Text Using Vector Space Model"; Computer Engineering Department, Dokuz Eylul University, Izmir Turkey; 2016.

(Continued)

*Primary Examiner* — Noosha Arjomandi
(74) *Attorney, Agent, or Firm* — Fabian VanCott; Steven L. Nichols (57) ABSTRACT

Familiarity-based text classification framework selection is described. A list of participants in an electronic message thread is selected. For each pairing of participants, a familiarity score is determined based on a number of criteria. A familiarity model is formed based on multiple familiarity scores and a text classification framework for the electronic message thread is selected based on the familiarity model.

20 Claims, 7 Drawing Sheets

(56) References Cited

U.S. PATENT DOCUMENTS

| | | | | |
|---|---|---|---|---|
| 2008/0183833 | A1* | 7/2008 | Gaucas | G06Q 10/107 709/207 |
| 2012/0209853 | A1* | 8/2012 | Desai | G06F 16/93 707/741 |
| 2014/0108527 | A1* | 4/2014 | Aravanis | G06Q 50/01 709/204 |
| 2014/0114978 | A1* | 4/2014 | Chatterjee | G06Q 10/107 707/739 |
| 2015/0199614 | A1 | 7/2015 | Pinel et al. | |
| 2015/0205860 | A1* | 7/2015 | Okura | G06F 16/3344 707/727 |
| 2015/0220835 | A1* | 8/2015 | Wilson | G06Q 30/0282 706/46 |
| 2015/0249631 | A1* | 9/2015 | Lu | G06F 16/284 707/736 |
| 2016/0014151 | A1* | 1/2016 | Prakash | H04L 63/1483 726/22 |
| 2016/0241494 | A1* | 8/2016 | Badge | H04L 51/046 |
| 2016/0261544 | A1* | 9/2016 | Conover | H04L 67/306 |
| 2016/0283481 | A1 | 9/2016 | Morley et al. | |
| 2016/0294836 | A1* | 10/2016 | Williams | G06Q 50/01 |
| 2016/0307249 | A1* | 10/2016 | Ku | G06Q 50/01 |
| 2016/0335271 | A1* | 11/2016 | Gertzfield | G06F 16/9537 |
| 2017/0026254 | A1* | 1/2017 | Adylov | H04L 51/16 |
| 2017/0034087 | A1* | 2/2017 | Borenstein | H04L 51/08 |
| 2017/0034226 | A1 | 2/2017 | Bostick et al. | |
| 2017/0278038 | A1* | 9/2017 | Wu | G06Q 10/06 |
| 2017/0289210 | A1* | 10/2017 | Pai | G06F 40/197 |
| 2017/0308790 | A1* | 10/2017 | Nogueira dos Santos | G06N 3/0454 |
| 2017/0337250 | A1* | 11/2017 | Li | G06Q 50/01 |
| 2017/0344224 | A1* | 11/2017 | Kay | G06F 40/205 |
| 2018/0096437 | A1* | 4/2018 | Sun | G06Q 30/08 |
| 2018/0183737 | A1* | 6/2018 | Subbarayan | G06Q 20/3223 |
| 2018/0293278 | A1* | 10/2018 | Kapoor | G06Q 50/01 |
| 2018/0296929 | A1* | 10/2018 | Vaccari | A63F 13/30 |
| 2018/0300414 | A1* | 10/2018 | Chen | G06F 3/048 |
| 2018/0357303 | A1* | 12/2018 | Tomkins | G06F 16/35 |
| 2019/0121907 | A1* | 4/2019 | Brunn | G06F 16/353 |
| 2019/0121912 | A1* | 4/2019 | Baweja | G06Q 30/0267 |
| 2019/0163816 | A1* | 5/2019 | Francis | G06K 9/6278 |
| 2019/0179955 | A1* | 6/2019 | Geyer | G06N 20/10 |

OTHER PUBLICATIONS

Anonymously; "System and Method for Differentiated Text Formatting for Users in Group IM Chats"; http://ip.com/IPCOM/000200017D; Sep. 23, 2010.

Anonymously; "Method and System to Automatically Prevent Social Network System Users from Exchanging Inappropriate Content"; http://ip.com/IPCOM/000225704D; Feb. 27, 2013.

* cited by examiner

|   | A | B | C | D | E | F |
|---|---|---|---|---|---|---|
| A | 0 | 1 | 12 | 0 | 0 | 0 |
| B | 1 | 0 | 0 | 1 | 0 | 0 |
| C | 12 | 0 | 0 | 8 | 0 | 0 |
| D | 0 | 1 | 8 | 0 | 14 | 0 |
| E | 0 | 0 | 0 | 14 | 0 | 19 |
| F | 0 | 0 | 0 | 0 | 19 | 0 |

FAMILIARITY-BASED TEXT CLASSIFICATION FRAMEWORK SELECTION

BACKGROUND

The present invention relates to electronic message classification, and more specifically, to the selection of a text classification framework based on a familiarity between participants in the electronic message thread. In professional and social environments, users interact with one another using electronic messages. Such electronic messages can come in a variety of formats including text, audio, and video. Group messaging systems provide a platform for such electronic interaction. Examples of such group messaging systems include social networking systems, internal messaging systems, such as within an organization, and other collaborative spaces. The use of these group messaging systems is increasing, and will continue to increase, with the expanding nature of electronic social interactions. That is, inter-user electronic interactions are becoming less and less tied to geographical boundaries and group messaging systems as a whole are becoming an increasingly relevant component of human correspondence such that their use within society will continue to expand.

SUMMARY

According to an embodiment of the present invention, a computer-implemented method for selecting an electronic message text classification framework based on participant familiarity is described. According to the method, a list of participants in an electronic message thread is obtained and for each pairing of participants, a familiarity score is determined based on a number of criteria. Using multiple familiarity scores, a familiarity model is formed and a text classification framework for the electronic message thread is selected based on the familiarity model.

The present specification also describes a system. The system includes a database that includes an electronic message thread and a list of participants in the electronic message thread. A familiarity determiner of the system determines, for each pairing of participants in the electronic message thread, a familiarity score. A model generator of the system generates a familiarity model. The familiarity model indicates a familiarity score for each pair of participants. A framework controller selects a text classification framework based on the familiarity model.

The present specification also describes a computer program product. The computer program product includes a computer readable storage medium having program instructions embodied therewith. The program instructions are executable by a processor to cause the processor to 1) obtain a list of participants in an electronic message thread and 2) determine, for each pairing of participants, a familiarity score based on a number of criteria. The program instructions are also executable by a processor to cause the processor to form a familiarity model based on multiple familiarity scores. Using the familiarity model, the program instructions are executable by the processor to cause the processor to 1) select a text classification framework for each electronic message thread based on the familiarity model and 2) apply the selected text classification framework to the electronic message thread.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described above, electronic messaging within groups has become a form of day-to-day correspondence for many people. In some examples, relevant and valuable information is passed through these collaborative groups. Text classification can be executed on incoming messages to infer a meaning of a text message and/or to summarize the content of the text message. The meaning and or summarization can then be used in a number of ways. For example, the summaries or meanings of individual electronic messages or multiple electronic messages in a thread corpus can be catalogued. Thus a user, at some later point in time, can more easily identify relevant conversations or information passed in a collaborative space related to a particular topic, or between particular individuals.

As another example, the meaning and/or summarization derived from text classification can be the basis for some action fulfillment process. As a specific example, a first user may type the message in an instant message conversation to a colleague asking whether a meeting at a particular time is needed to discuss a product under development. In this example, a text classification framework may summarize the text as a request to set an appointment on either or both of the user's calendars. Using this text classification, an action fulfillment system could initialize an operation to set a calendar event, or prompt the user to create such an event. While this is one specific system, text classification is used regularly to classify and/or summarize text of an electronic message thread or other message corpus, which classification is used in any number of ways to provide services to a user.

Because such text classification frameworks are widely used, and are likely to be even more widely used as electronic message correspondence grows in use over time, advancements to the operation thereof will facilitate their more complete technical integration. Specifically, as text classifications become more accurate, they can be more fully embraced in textual analysis.

Accordingly, the present specification describes a method and system that provide enhanced textual classification. Specifically, a text classification framework is selected from among multiple frameworks based on a familiarity between participants in an electronic message thread which the text classification framework is tasked with summarizing. In other words, rather than merely analyzing the content of an electronic message, i.e., the text, to infer meaning and/or summarize, the present system and method rely also on relationships between participants to select a text classification framework. Doing so provides another criterion, i.e., familiarity, on which text classification framework selection can be made. This additional information allows a more tailored text classification framework to be selected. For example, certain text classification frameworks may be better suited for conversations between more closely related individuals. That is, some text classification frameworks generally provide narrower results, which may be advantageous when participants are familiar with one another, but may be overly narrow with participants who are not as familiar with one another. As another example, other text classification frameworks provide broad results, which may be effective for participants more unfamiliar with one another, but may not be as accurate, or be as helpful, to participants who are very familiar with one another.

In summary, such a system and method 1) provide more accurate textual classifications; 2) provide more relevant subsequent operations such as action fulfillment and textual navigation; and 3) are tailored to a particular group of participants. However, it is contemplated that the devices disclosed herein may address other matters and deficiencies in a number of technical areas.

As used in the present specification and in the appended claims, the term "text classification framework" refers to a system that is used to classify and/or summarize a text message. Examples of text classification frameworks include, but are not limited to, a Naïve-Bayes text classification framework, a support vector machine text classification framework, a random tree text classification framework, a random forest text classification framework, a logistic regression text classification framework, an artificial neural network text classification framework, a convocational neural network text classification framework, and a recurrent neural network text classification framework.

Further, as used in the present specification and in the appended claims, the term "a number of" or similar language is meant to be understood broadly as any positive number including 1 to infinity.

Figure 1:
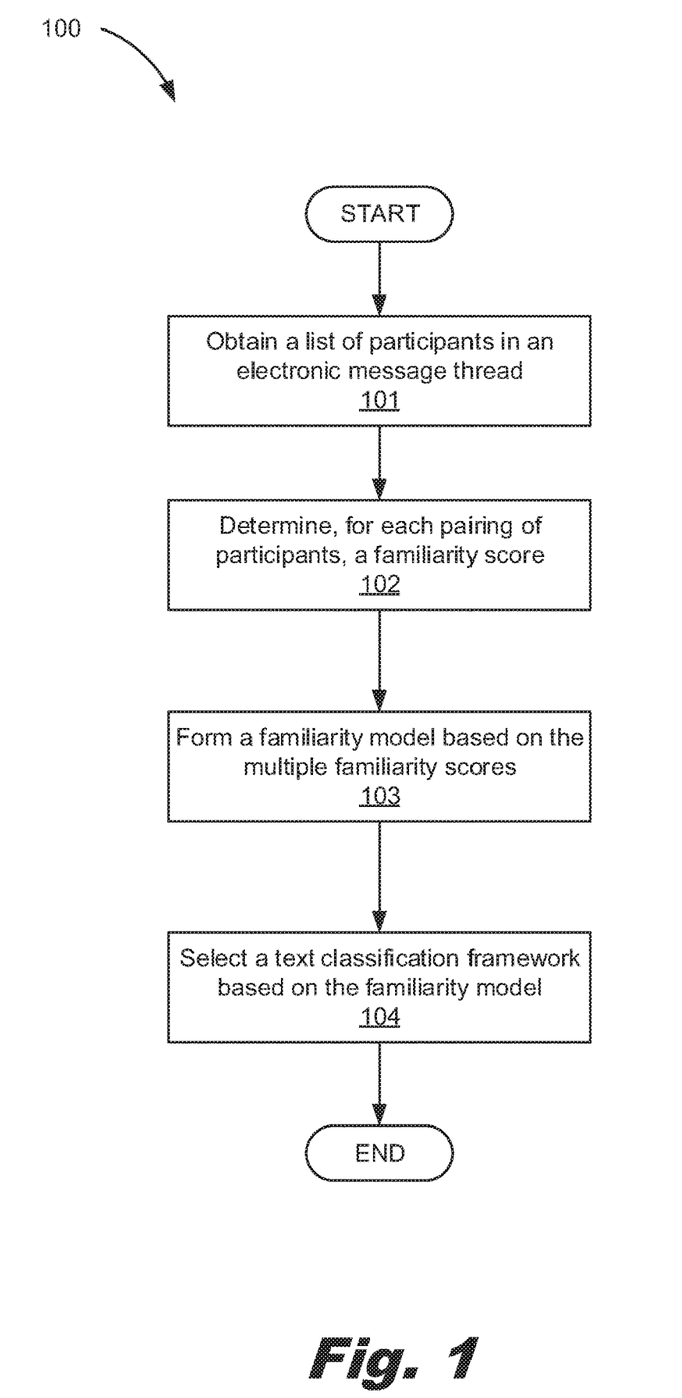
FIG. 1 depicts a flowchart of a method for familiarity-based selection of a text classification framework, according to an example of principles described herein.

Turning now to the figures. FIG. 1 depicts a flowchart of a method (100) for familiarity-based selection of a text classification framework, according to an example of principles described herein. According to the method, a list of participants in an electronic message thread is obtained (block 101). As described above, any number of individuals may be connected in a collaborative space and may interact with each other. For example, a product development team may start an electronic message group where they can share ideas, developments, and other information relating to a particular project that is being developed. Each individual may have a username or other ID that is stored in a database. As the individual enters a conversation, a username or other ID for that individual is obtained (block 101) and stored, for example in a user table.

A familiarity score is then determined (block 102) for pairings of participants in the electronic message thread. More specifically, each participant is paired with every other participant and a familiarity score determined (block 102) for each of those relationships. For example, a first participant, second participant, and third participant may be engaged in an electronic message thread. In this example, a familiarity score is determined between the first and second participants, the first and third participants, and the second and third participants. These familiarity scores can be determined (block 102) using a number of criteria in any fashion. For example, the familiarity score can be determined (block 102) based on explicit mentions of one another over a period of time, implicit mentions of one another over a period of time, explicit and implicit use of nicknames of one another over a period of time, and proximity of messages. Familiarity can also be determined based on joint participation in discourses. Other examples upon which familiarity between two participants can be determined include a geographical proximity of the participants and the relative organizational affiliation, i.e., a manager/worker relationship. While specific reference is made to particular criteria upon which familiarity between two participants is determined, other criteria may be used as well.

In some examples, the different criteria may be represented as count data. That is, each instance of an explicit mention, or an implicit mention, or temporal proximity of messages (as measured by a threshold time), can increase a counter that is indicative of a level of familiarity. For example, if a first participant directly refers to the second participant five times and has four messages that are temporally close (as measured by a threshold) to messages by the second participant, the count data may be nine for this relationship, thereby reflecting a familiarity score of nine. As indicated, the familiarity score may be a numeric value. In some cases this numeric value is presented as a familiarity score without adjustment. In another example, the count data indicating familiarity may be normalized such that multiple familiarity scores may be readily compared.

From multiple familiarity scores between different pairings of participants, a familiarity model is formed (block 103). A familiarity model is a representation of the different relationships within an organization as well as their relative familiarity. For example, a familiarity model may graphically depict that the first participant has a closer relationship with the second participant than with the third participant. This familiarity model can be represented in any number of ways including as a weighted directed graph and an adjacency matrix. Examples of familiarity models as a weighted directed graph and as an adjacency matrix are presented below in connection with FIGS. 5 and 6.

Such a familiarity model is used to select (block 104) a text classification framework. As described herein, there are a number of different text classification frameworks that could be used to classify a particular electronic message. Examples of text classification frameworks include, but are not limited to, a Naïve-Bayes text classification framework, a support vector machine text classification framework, a random tree text classification framework, a random forest text classification framework, a logistic regression text classification framework, an artificial neural network text classification framework, a convocational neural network text classification framework, and a recurrent neural network text classification framework.

Each of the different text classification frameworks operates differently from one another, and accordingly, may result in different classifications of a particular electronic message. The different classifications may be more or less precise and accurate than classifications from other text classification frameworks, depending on a particular context and the content of a particular electronic message. For example, text classification frameworks may differ in the depth of their classifications with some providing more narrow classifications and others providing more broad classifications. Narrow classifications may be particularly useful for participants that are more familiar with one another as they may have a similar vernacular that can be properly classified with a narrow text classification framework. By comparison, when individuals are less familiar with one another, a broad text classification framework may be desired as it has broader applicability.

Accordingly, a text classification framework that suits the participants is selected (block 104). As will be described below, the text classification framework that is selected (block 104) may be updated over the life of the electronic message thread. For example, a first participant and a second participant, who may be very familiar with one another, may initially be the main contributors to an electronic message thread. Accordingly, a first text classification framework may be selected (block 104) based on their high level of familiarity and the other participants may see a text classification based on that familiarity and corresponding first text classification framework. However, at a later point in the conversation the first participant and the third participant, who are less familiar with one another, may dominate the electronic message thread such that a second text classification framework is selected to replace the first text classification framework, which second text classification framework is based on the reduced familiarity between the first participant and the third participant. In some examples, the familiarity model is dynamic meaning that the familiarity scores between participants may adjust, or be weighted, based on the level of participation of the different participants. Accordingly, the selection (block 104) of a particular text classification framework is based on the weight of the familiarity score.

Such a method (100) allows for the arbitration of text classification frameworks based on familiarity of different participants. Doing so achieves a higher quality text classification. In other words, by determining a level of familiarity between users, overall precision of a text classification system is improved within real-time chat collaboration systems and other group collaborative spaces. That is, as the different frameworks may perform differently based on particular characteristics of a messaging thread, the present method (100) ensures that the text classification framework with the best performance can be implemented thus providing a message-tailored classification system. Using the text classification framework based on a familiarity model of the participants enhances the results of subsequent operations. In other words, the method (100) as described herein increases the ability of a computing system to provide accurate and relevant text classifications, which accurate and relevant text classifications increase the technical ability of a computing system to carry out any number of subsequent operations including action fulfillment. Thus, a computing system that executes the method (100) has increased technical capability to analyze and classify electronic messages.

In some examples, the familiarity model may be used to expand other technology areas. For example, as will be described below in FIG. 5, the familiarity model may be used to identify social groups and/or perform topic clustering.

Figure 2:
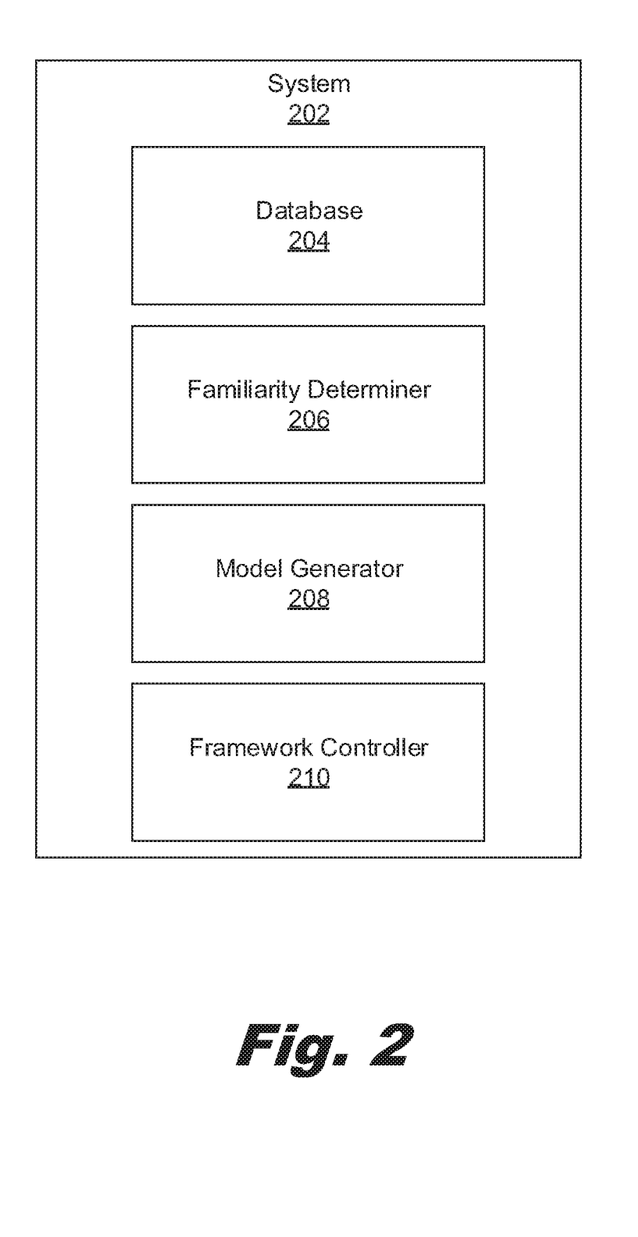
FIG. 2 depicts a system for familiarity-based selection of a text classification framework, according to an example of the principles described herein.

FIG. 2 depicts a system (202) for familiarity-based selection of a text classification framework, according to an example of the principles described herein. To achieve its desired functionality, the system (202) includes various components. Each component may include a combination of hardware and program instructions to perform a designated function. The components may be hardware. For example, the components may be implemented in the form of electronic circuitry (e.g., hardware). Each of the components may include a processor to execute the designated function of the engine. Each of the components may include its own processor, but one processor may be used by all the components. For example, each of the components may include a processor and memory. Alternatively, one processor may execute the designated function of each of the components.

The system (202) includes a database (204). The database (204) stores an electronic message thread. That is, the database (204) stores, either temporarily or permanently, the body of the electronic messages that make up the electronic message thread. Thus, the system (202) may classify the electronic messages by analyzing the messages as they are stored in the database (204).

The database (204) also stores a list of participants in the electronic message thread. For example, the database (204) may include a participant table that includes profile information for various users and can identify when those users are participating in a particular electronic message thread and can associate the participant with the messages incorporated therein.

In some examples, the database (204) stores a number of text classification frameworks that are used to classify incoming electronic messages. As described above, any number of text classification frameworks may be used at different points in time, and those different text classification frameworks may be stored in the database (204) of the system (202). As different text classification frameworks are selected for use, they are called from the database (204).

The system also includes a familiarity determiner (206). The familiarity determiner (206) determines, for each pairing of participants, a corresponding familiarity score. The familiarity score may be a numerical representation of familiarity based at least on, past collaboration, geographical proximity, temporal relation of messages they have authored, direct and indirect references to that individual, as well as hierarchical proximity. While specific reference is made to particular criteria upon which familiarity is determined, any number of criteria may be relied on to determine this familiarity. Such criteria may be combined and/or weighted in any fashion to indicate familiarity, with familiarity in some examples being represented as a numeric value, either raw or scaled/normalized.

The system (202) also includes a model generator (208) to generate a familiarity model based on the multiple familiarity scores. That is, in either a weighted or raw fashion, the familiarity scores may be presented as a model, which model is used to select a text classification framework. In some examples, the familiarity model is dynamic, meaning it changes over time. For example, the familiarity model may weight different familiarity scores based on the respective participants' involvement in a particular electronic message thread, with different scores being weighted lower if the corresponding participants are not as actively engaged in the conversation. Note that as the familiarity model is dynamic over the course of an electronic message thread, the text classification framework that is selected may be updated to reflect a change to the familiarity model.

The framework controller (210) of the system (202) then controls the multiple text classification frameworks based on the familiarity model generated by the model generator (208). Based on this familiarity model, the framework controller (210) calls and executes a particular text classification framework and prevents others from executing. Thus, the system (202) selects and executes various text classification frameworks, switches between text classification frameworks, and may manipulate a text classification framework (i.e., change the operating parameters of a selected text classification framework) to provide more accurate results. All this is done within the specific context of participants in an electronic message thread such that the determination regarding which text classification framework to use is specifically related to the present electronic message. Evaluating various text classification accuracy as it pertains to a particular electronic message increases the system (202) technical capability to provide relevant, and accurate, textual classifications.

Figure 3:
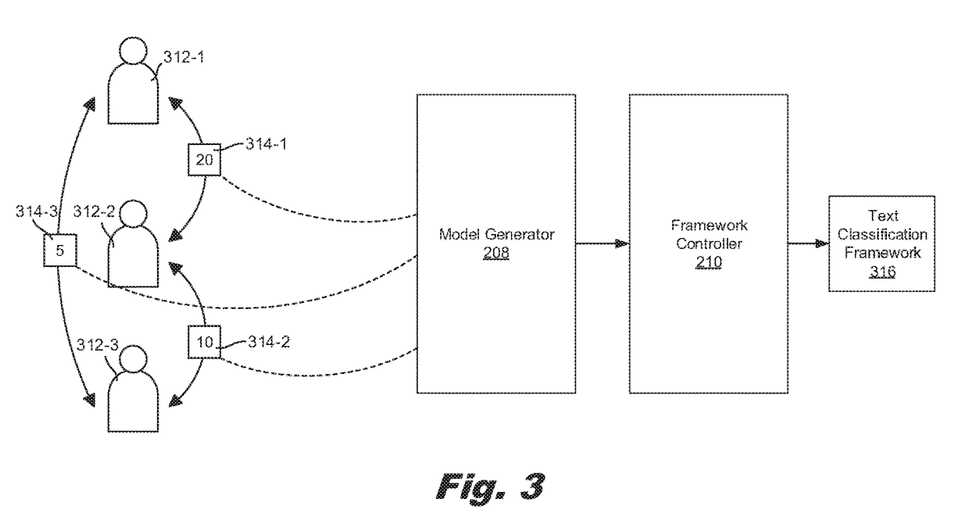
FIG. 3 depicts a flow diagram for familiarity-based selection of a text classification framework, according to an example of the principles described herein.

FIG. 3 depicts a flow diagram for familiarity-based selection of a text classification framework, according to an example of the principles described herein. As described above, during an electronic collaborative session such as a group messaging chat between multiple users, electronic messages may be shared. The different participants (312) may have different levels of familiarity with one another. For example, a first participant (312-1) may have a first familiarity score (314-1) with respect to a second participant (312-2) that is given a numeric value of twenty. The first participant (312-1) may have another familiarity score (314-3) with respect to a third participant (312-3) that is given a numeric value of five. In this example, a higher numeric value indicates more familiarity and may indicate a count of certain events such as direct references, temporally-related messages, etc. Still further the second participant (312-2) may have a familiarity score (314-2) with respect to the third participant (312-3) that is given a numeric value of ten.

Figure 5:
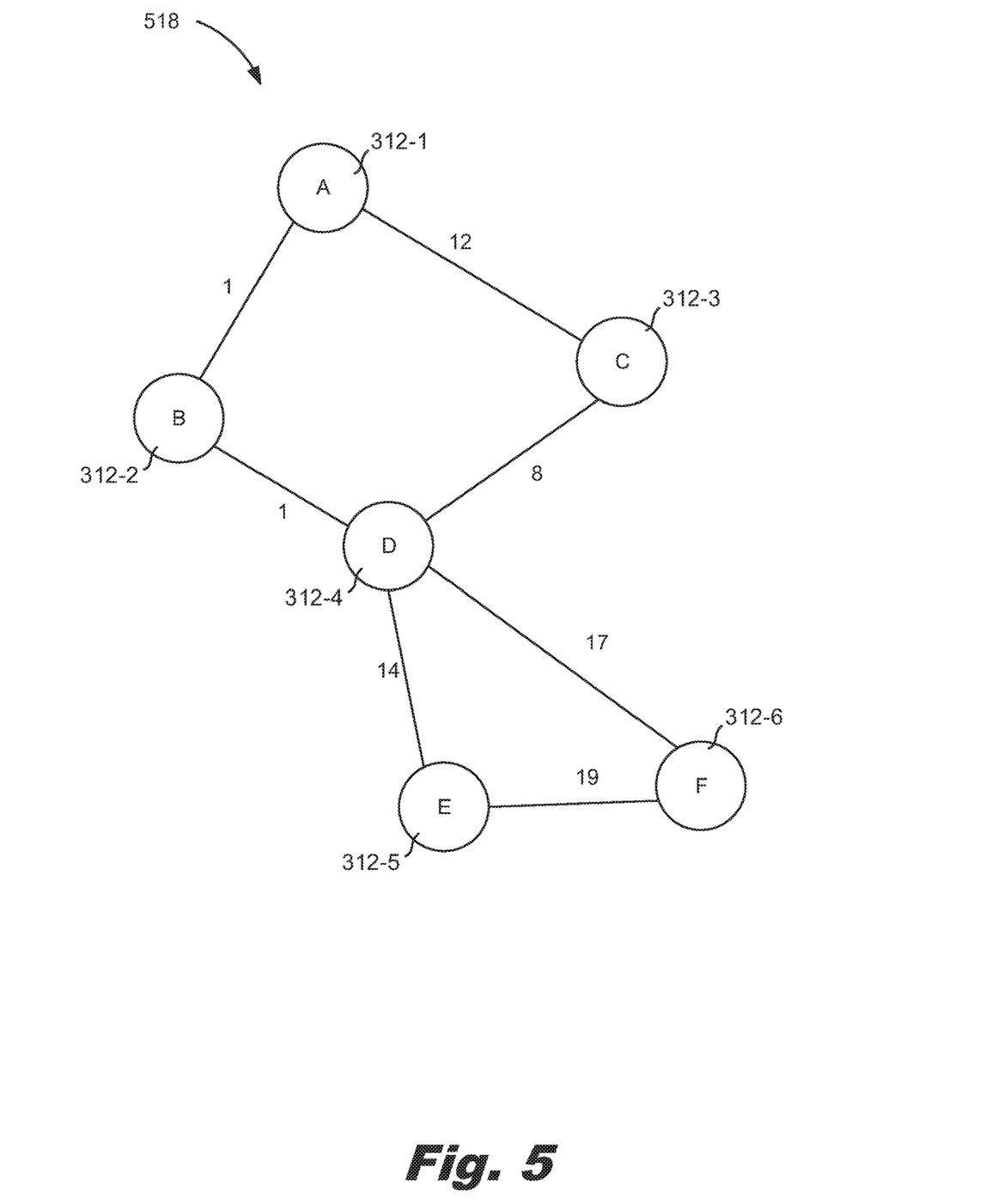
FIG. 5 depicts a weighted directed graph familiarity model, according to an example of the principles described herein.
Figure 6:
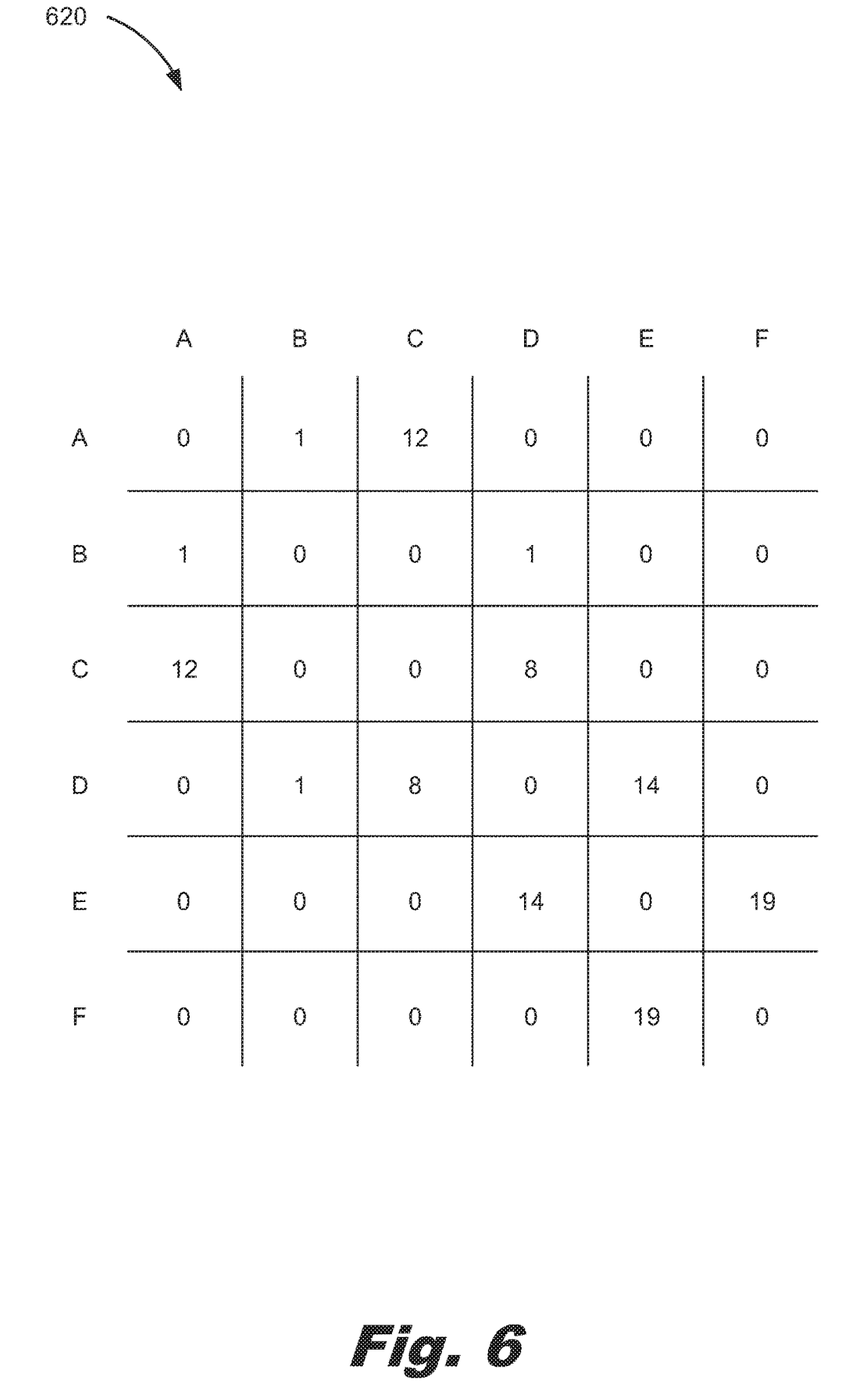
FIG. 6 depicts an adjacency matrix familiarity model, according to an example of the principles described herein.

In this example, each familiarity score (314) is passed to the model generator (206) that generates a familiarity model that indicates each of the familiarity scores (314) and weights them as desired. While FIG. 3 depicts three participants (312), note that any number of participants (312) may be engaged in an electronic message thread. Returning to the model generator (208), a familiarity model may take many forms and may be represented as a weighted directed graph or an adjacency matrix as depicted in FIGS. 5 and 6, respectively. However, any other representation of the relationships between participants (312) may be generated. The output of the model generator (208), i.e., the familiarity model, is passed to the framework controller (210), which framework controller (210) selects, calls, and executes a particular text classification framework (316) and prevents other text classification frameworks (316) from executing. Note that in some examples, in addition to selecting, calling, and executing a particular text classification framework (316), the framework controller (210) may manipulate the parameters of a selected text classification framework.

Returning to the framework controller (210), the selected text classification framework (314) may be based on a level of participation of the different participants (312). For example, if a conversation is dominated by the first participant (312-1) and the second participant (312-2), a first text classification framework (314) is selected. However, as mentioned above, the familiarity model is dynamic such that at different points of the conversation, as different participants (312) increase and decrease their participation, the selected text classification framework (314) may be adjusted. For example, the first participant (312-1) may leave the conversation, or take a less prominent role in the conversation and the third participant (312-3) may increase his role. Accordingly, the framework controller (210) may swap the first text classification framework (314), which is reflective of the familiarity between the first and second participants (312-1, 312-2) for a second text classification framework (314), which is reflective of the familiarity between the second and third participants (312-2, 312-3).

Figure 4:
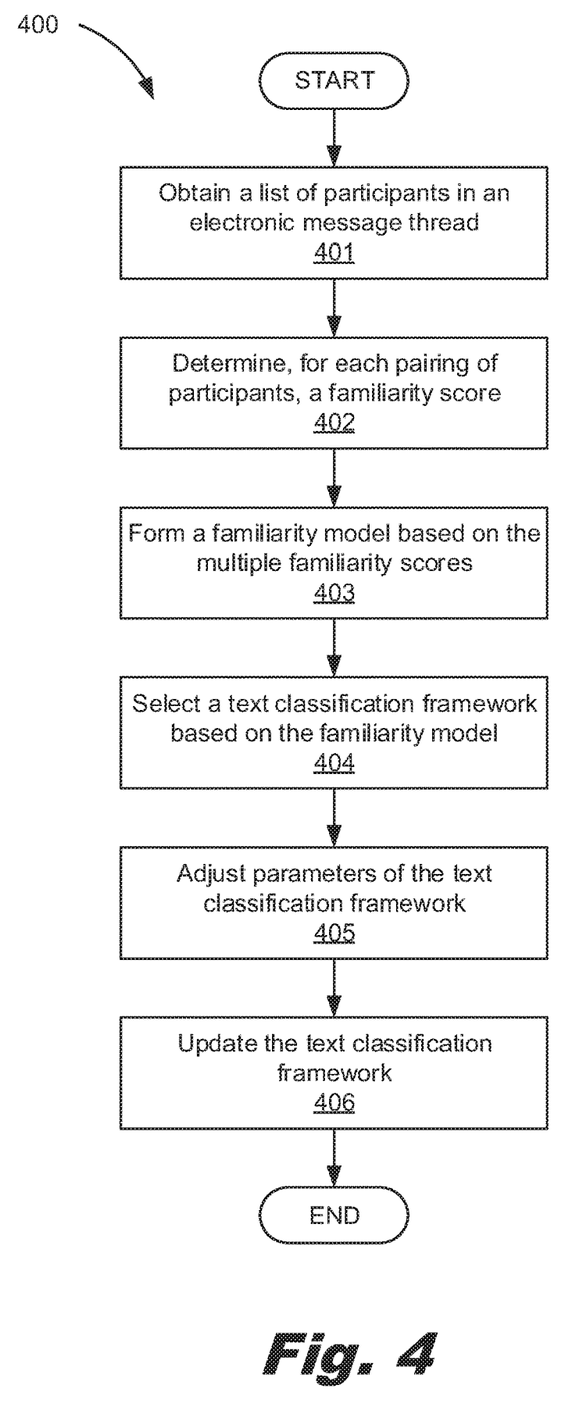
FIG. 4 depicts a flowchart of a method for familiarity-based selection of a text classification framework, according to an example of principles described herein.

FIG. 4 depicts a flowchart of a method (400) for familiarity-based selection of a text classification framework (FIG. 3, 316), according to an example of principles described herein. According to the method (400), a list of participants (FIG. 3, 312) is obtained (block 401) and a familiarity score (FIG. 3, 314) between each pairing is determined (block 402). This may be performed as described above in connection with FIG. 1.

A familiarity model is then formed (block 403) indicating the various familiarity score (FIG. 3, 314) and a text classification framework (FIG. 3, 316) selected (block 404) based on that familiarity model. This may be performed as described above in connection with FIG. 1.

In some examples, the parameters of the text classification framework (FIG. 3, 316) may be adjusted (block 405). For example, some text classification frameworks such as a support vector machine text classification framework may have different parameters such as a log parameter, a penalty, and an apha, n_iter, and random_state parameters that are used to classify electronic messages. These may be adjusted (block 405) when a support vector machine text classification framework (FIG. 3, 316) is selected. For example, familiarity score (FIG. 3, 314) of ten and fifteen may both correspond to an SVM text classification framework (FIG. 3, 316), but with different parameters to account for the difference in familiarity.

Still further, in some examples, the text classification framework (FIG. 3, 316) may be updated (block 406). Such updating may be in real-time, i.e., during exchanging of electronic messages in an electronic message thread. Such updates (block 406) may be based on any number of factors. For example, the text classification framework (FIG. 3, 316) may be updated (block 406) based on a list of participants (FIG. 3, 312). That is, when a participant (FIG. 3, 312) leaves, or joins, an electronic message thread, the familiarity model changes based on their familiarity with other participants (FIG. 3, 312). Accordingly, the familiarity model, and corresponding selected text classification framework (FIG. 3, 316) may change as well.

As another example, the text classification framework (FIG. 3, 316) may be updated (block 406) based on a change to a familiarity score (FIG. 3, 314). That is, as participants (FIG. 3, 312) become more familiar with one another, the familiarity model changes. Accordingly, the familiarity model, and corresponding selected text classification framework (FIG. 3, 316) may change as well.

As yet another example, the text classification framework (FIG. 3, 316) may be updated (block 406) based on another change to the familiarity score (FIG. 3, 314). That is, a weighting for the different familiarity scores (FIG. 3, 314) may change. Accordingly, the familiarity model, and corresponding selected text classification framework (FIG. 3, 316) may change as well.

As yet another example, the text classification framework (FIG. 3, 316) may be updated (block 406) based on a change to the level of participation of the participants (FIG. 3, 312). For example, as different participants (FIG. 3, 312) who have differing levels of familiarity one with another exchange leading roles in an electronic message thread, the familiarity model, and corresponding selected text classification framework (FIG. 3, 316) may change as well.

FIG. 5 depicts a weighted directed graph (518) familiarity model, according to an example of the principles described herein. As described above, the familiarity model may be depicted as a weighted directional graph (518) wherein nodes of the weighted directed graph (518) represent participants (312-1, 312-2, 312-3, 312-4, 312-5, 312-6) and edges between the nodes indicate a numeric value which is indicative of a level of familiarity between each participant (312).

In one example, the system (FIG. 2, 202) uses the familiarity model to identify social groups. That is, based on the familiarity model, it may be determined that a grouping of participants (312) are all familiar with one another, and as such are likely part of a social group. In one example, such information can be used to derive invitees to a meeting. For example, as depicted in FIG. 5, participants D (312-4), E (312-5), and F (312-6) all are familiar with one another, and therefore are likely part of a social group, such as a work group. Accordingly, if participants D (312-4) and F (312-6) are invited to a meeting, participant E (312-5) may be suggested as a potential invitee as being part of a social group with participants D (312-4) and F (312-6). Inferred groups that are reinforced over time can then be leveraged and extended. For example, the system (FIG. 2, 202) could suggest a custom grouping to notify members of the group of some content based on the relevance of the content and the selected text classification framework (FIG. 3, 316).

The system (FIG. 2, 202) may also use the familiarity model to perform topic clustering. That is, the electronic message thread may be analyzed to determine a topic for the electronic message thread. The familiarity model, and more particular the level (FIG. 3, 314) of familiarity between the participants may aide in determining what the topic is for a particular electronic message thread, or a portion of an electronic message thread. One specific topical clustering operation is k-means clustering. In k-means clustering, a starting topic is selected. Nearest messages, in terms of mean location, are then analyzed to determine if the nearest messages are related to the initial starting point. If there is convergence, i.e., the nearest messages are related to the initial starting point, the messages become a cluster. Alternatively, if there is no convergence, i.e., the nearest messages are not related to the initial starting point, an arbitrary term is selected and the clustering process restarted.

FIG. 6 depicts an adjacency matrix (620) familiarity model, according to an example of the principles described herein. As described above, the familiarity model may be depicted as an adjacency matrix (620) wherein familiarity scores (FIG. 3, 314) are defined within different cells of the adjacency matrix (620). As stated above, such a familiarity model may be used to identify social groups and to aide in topic clustering. The adjacency matrix (620) is a two dimensional array in which each cell indicates whether an edge, i.e., relationship, is present between two vertices, i.e., participants. An edge between two vertices is indicated with a 1; while the absence of an edge is indicated by a 0. In the adjacency matrix (620), cell values increase based on count data, i.e., instances that indicate increased familiarity.

Figure 7:
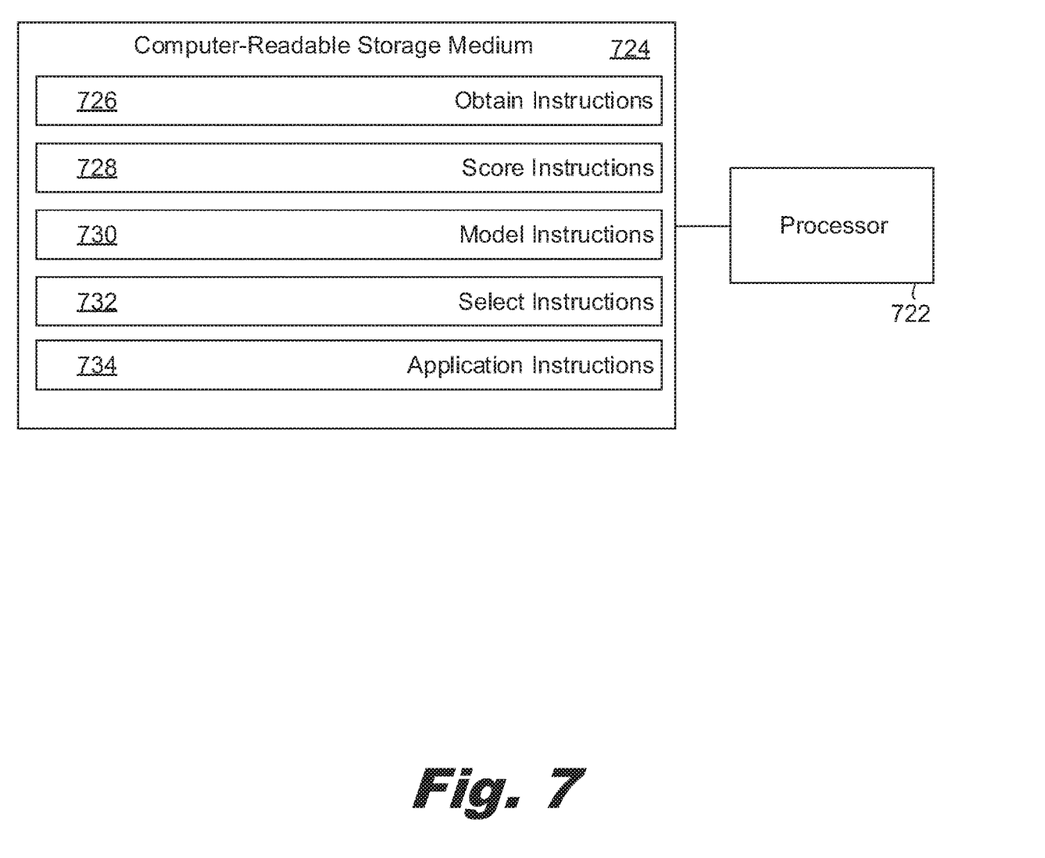
FIG. 7 depicts a computer readable storage medium for familiarity-based selection of a text classification framework, according to an example of principles described herein.

FIG. 7 depicts a computer readable storage medium (724) for familiarity-based selection of a text classification framework (FIG. 3, 316), according to an example of principles described herein. To achieve its desired functionality, a computing system includes various hardware components. Specifically, a computing system includes a processor (722) and a computer-readable storage medium (724). The computer-readable storage medium (724) is communicatively coupled to the processor (722). The computer-readable storage medium (724) includes a number of instructions (726, 728, 730, 732, 734) for performing a designated function. The computer-readable storage medium (724) causes the processor (722) to execute the designated function of the instructions (726, 728, 730, 732, 734).

Referring to FIG. 7, obtain instructions (726), when executed by the processor (722), cause the processor (722) to obtain a list of participants (FIG. 3, 312) in an electronic message thread. Score instructions (728), when executed by the processor (722), may cause the processor (722) to determine, for each pairing of participants (FIG. 3, 312), a familiarity score (FIG. 3, 314) between the participants (FIG. 3, 312) in the pairing based on a number of criteria. Model instructions (730), when executed by the processor (722), may cause the processor (722) to form a familiarity model based on multiple levels (FIG. 3, 314) of familiarity. Select instructions (732), when executed by the processor (722), may cause the processor (722) to select a text classification framework (FIG. 3, 316) for each electronic message thread based on the familiarity model. Application instructions (734), when executed by the processor (722), may cause the processor (722) to apply the selected text classification framework (FIG. 3, 316) to the electronic message thread.

In summary, such a system and method 1) provide more accurate textual classifications; 2) provide more relevant subsequent operations such as action fulfillment and textual navigation; and 3) are tailored to a particular group of participants. However, it is contemplated that the devices disclosed herein may address other matters and deficiencies in a number of technical areas.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining a list of participants in an electronic message thread;
   determining a familiarity score between each participant and one other participant based on a relationship between the participants;
   forming a familiarity model based on multiple familiarity scores; and
   selecting a text classification framework for the electronic message thread based on the familiarity model, wherein the text classification framework comprises a framework to classify messages in the electronic message thread.

2. The computer-implemented method of claim 1, further comprising updating the text classification framework based on a change to the familiarity model.

3. The computer-implemented method of claim 2, wherein updating the text classification framework occurs in real time.

4. The computer-implemented method of claim 2, wherein updating the text classification framework is based on a change to the list of participants.

5. The computer-implemented method of claim 2, wherein updating the text classification framework is based on a change to at least one of the familiarity scores.

6. The computer-implemented method of claim 2, wherein updating the text classification framework is based on a change to a level of participation of at least one participant.

7. The computer-implemented method of claim 1, further comprising adjusting parameters of the selected text classification framework based on at least one familiarity score.

8. The computer-implemented method of claim 1, wherein the familiarity model is weighted based on participant participation.

9. The computer-implemented method of claim 8, wherein selection of a text classification framework is based on a weight of a familiarity score.

10. The computer-implemented method of claim 1, wherein the familiarity score is determined based on a number of criteria, wherein the number of criteria comprises at least one criteria selected from the group consisting of:
explicit references to a particular participant;
implicit references to the particular participant;
collaborate work of participants;
temporal proximity of messages between participants;
geographical proximity of participants; and
relative organizational affiliation.

11. A system comprising:
a database comprising:
an electronic message thread; and
a list of participants in the electronic message thread;
a familiarity determiner, comprising a processor, to determine, for each combination of two participants in the electronic message thread, a familiarity score indicating a relationship between members of the combination;
a model generator, comprising a processor, to generate a familiarity model, which familiarity model is based on a familiarity score for each combination of two participants; and
a framework controller, comprising a processor, to select a text classification framework based on the familiarity model, wherein the text classification framework comprises a framework to classify and summarize messages in the electronic message thread.

12. The system of claim 11, wherein the familiarity model for the electronic message thread is dynamic.

13. The system of claim 11, wherein:
the familiarity model comprises a weighted directional graph;
nodes of the weighted directional graph represent participants; and
edges of the weighted directional graph indicate a numeric familiarity score.

14. The system of claim 11, wherein the familiarity model comprises an adjacency matrix.

15. The system of claim 14, wherein each familiarity score is a numeric value.

16. The system of claim 15, wherein the numeric value is normalized.

17. A computer program product, the computer program product comprising a computer readable storage medium having program instructions embodied therewith, the program instructions executable by a processor to cause the processor to:
obtain a list of participants in an electronic message thread;
determine, for each combination of two participants, a familiarity score indicating a count of overall instances of:
explicit references to a particular participant;
implicit references to the particular participant;
collaborate work of participants;
temporal proximity of messages between participants;
geographical proximity of participants; and
relative organizational affiliation;
form a familiarity model based on multiple familiarity scores;
visually depict the familiarity model indicating relationships and relative familiarity;
select a text classification framework for each electronic message thread based on the familiarity model, wherein:
the text classification framework comprises a framework to classify and summarize messages in the electronic message thread; and
a narrower text classification framework is selected for participants who have a greater familiarity with one another; and
apply the selected text classification framework to the electronic message thread.

18. The computer program product of claim 17, further comprising program instructions executable by a processor to cause the processor to identify social groups based on the familiarity model.

19. The computer program product of claim 17, further comprising program instructions executable by a processor to cause the processor to perform topic clustering based on the familiarity model.

20. The computer program product of claim 17, wherein the text classification framework is selected from the group consisting of a naïve Bayes text classification framework, a support vector machine text classification framework, a random tree text classification framework, a random forest text classification framework, a logistic regression text classification framework, an artificial neural network text classification framework, a convocational neural network text classification framework, and a recurrent neural network text classification framework.

* * * * *